United States Patent
Al-Mutawa

(10) Patent No.: US 8,086,356 B2
(45) Date of Patent: Dec. 27, 2011

(54) SYSTEM FOR MONITORING AND CONTROLLING THE CONSUMPTION OF A UTILITY

(76) Inventor: Mahmoud E. Al-Mutawa, Kuwait (KW)

( * ) Notice: Subject to any disclaimer, the term of this patent is extended or adjusted under 35 U.S.C. 154(b) by 500 days.

(21) Appl. No.: 12/259,377

(22) Filed: Oct. 28, 2008

(65) Prior Publication Data
US 2010/0106340 A1 Apr. 29, 2010

(51) Int. Cl.
*H01H 45/00* (2006.01)
(52) U.S. Cl. .......... 700/291; 700/295; 700/297
(58) Field of Classification Search .......... 700/9, 275, 700/286, 291, 295, 297
See application file for complete search history.

(56) References Cited

U.S. PATENT DOCUMENTS

| | | | |
|---|---|---|---|
| 4,117,537 A * | 9/1978 | Muench | 700/295 |
| 4,204,195 A | 5/1980 | Bogacki | |
| 4,370,723 A * | 1/1983 | Huffman et al. | 700/295 |
| 4,390,876 A * | 6/1983 | Bjorklund et al. | 340/3.7 |
| 4,646,084 A | 2/1987 | Burrowes et al. | |
| 5,696,695 A | 12/1997 | Ehlers et al. | |
| 6,429,642 B1 * | 8/2002 | Rodilla Sala | 324/142 |
| 7,062,361 B1 * | 6/2006 | Lane | 700/295 |
| 7,263,450 B2 | 8/2007 | Hunter | |
| 2009/0106891 A1 * | 4/2009 | Klicpera | 4/605 |

* cited by examiner

*Primary Examiner* — Kakali Chaki
*Assistant Examiner* — Carlos Ortiz Rodriguez
(74) *Attorney, Agent, or Firm* — Lowe Hauptman Ham & Berner, LLP

(57) ABSTRACT

A system for monitoring and controlling the consumption of electrical energy and for warning a consumer of the status of their use including subsystem that produces three warning levels. The first warning is a visual signal while the second signal is an audio signal. The third signal is an audio signal louder than the second signal to warn a consumer that their supply of power will be interrupted in a given amount of time. The third signal also includes a timer to indicate that the power will be discontinued within a number of minutes. The system also includes an internal electric current restoration unit for reconnecting the supply of power when a preselected period of time has passed or power has been reduced to a preselected level before being interrupted.

4 Claims, 4 Drawing Sheets

SYSTEM FOR MONITORING AND CONTROLLING THE CONSUMPTION OF A UTILITY

FIELD OF THE INVENTION

This invention relates to a system for monitoring and controlling the consumption of a utility and more particularly to a system for monitoring and controlling power consumption and for warning an individual of an excess of use during a pre-selected period of time.

BACKGROUND FOR THE INVENTION

Population growth and increased use of electrical energy by families and businesses are creating a need for new and expanded power plants. The problem is that power plants require large amounts of money and time for construction. In many cases political and investment criteria have postponed or eliminated the construction of new plants. Further, the construction and expansion of such plants are not favored in view of the environment. Consequently, certain areas have encountered or been threatened with brown-outs and a need to reduce and/or ration the consumption of electricity.

A further problem relates to a reluctance by many companies and individuals to reduce their use of energy. For example, many individuals in homes, offices, theaters and the like are reluctant to raise their thermostats even a few degrees during hot summer months. This problem is exacerbated by many relatively well off individuals who will pay a premium price to consume more than their fair share of electricity at the expense of poorer families who may not be able to pay increased costs for energy.

As a result, there has been a concerted effort to develop methods and apparatus for controlling power consumption. For example a U.S. Patent of Lane, U.S. Pat. No. 7,062,361 ('361) discloses a method and apparatus for controlling power consumption. As disclosed therein, a method and apparatus for controlling power consumption of a facility, building or collection of one or more devices by load shedding when power consumption is above, or is predicted to be above, a preselected setpoint as for example during periods of peak load. The apparatus and method disclosed in the '361 patent optimizes power usage and reduces demand during peak usage. The Lane patent also discloses the situation of a supermarket which refrigerates food products. Supermarkets typically use artificial product core temperature sensors or direct insertion product sensors to continuously monitor the refrigerated temperature of perishable products. A controller constantly monitors these temperatures to allow a precise load shedding routine to be implemented.

A further approach for reducing the consumption of electric power is disclosed in a U.S. Patent of Hunter, U.S. Pat. No. 7,263,450 ('450). As disclosed therein, an electro-optical, automatic meter reader enables a consumer to view and manage power consumption through a browser. A sensor is attached to a bracket and mounted to the outside cover of a utility meter without modification of the meter or removal of its housing. A data-collector stores data obtained from the sensor via a serial port which may also provide power for the sensor thus avoiding use of a dedicated power supply. The data-collector connects to a computer which provides a centralized object through which to view and manage power consumption. The real-time and combined historic data can be used to forecast whether usage will fall above or below a predetermined usage level at the end of a given period of time. In response to a forecast exceeding the level, the computer displays the appropriate graph in a red colored bar within a quantity vs. time chart. The computer may control power consuming devices. A communication system may also be established for remote management by the consumer or by the utility company for its own billing and management purposes.

Notwithstanding the above it is presently believed that there is a need and a potentially large commercial market for an improved system for monitoring and controlling the consumption of electric energy in accordance with the present invention. There should be a large demand for such systems since the systems conserve energy, reduce the likelihood of brown outs or interruption in the supply of electrical power. It is also believed that the use of the system in accordance with the present invention will enable power companies to postpone or scale back the need for new and expanded power generating plants and result in a more balanced distribution of power to everyone on the grid.

In addition to the above, the cost of implementing the systems in accordance with the present invention should be considerably lower than the cost of building new power plants and should be implemented in far less time than the time required to expand or build new plants. The system in accordance with the present invention should be relatively inexpensive to install, durable in operation and readily accessible for maintenance, reduce environmental pollution and encourage individuals and organizations to use electrical energy more efficiently.

It is also contemplated that the system in accordance with the present invention can be combined with the other systems such as those disclosed in the Lane, '361 patent for added advantages.

BRIEF SUMMARY OF THE INVENTION

In essence, the present invention contemplates a system and method for monitoring and controlling the consumption of electrical energy and for warning a consumer of the status of their use of a pre-selected amount of electric energy during a pre-selected period of time. The system and method also warns the consumer when they are approaching a second pre-selected level when power shedding is encouraged and finally a warning that the cut off of their supply of energy is imminent if power shedding is not immediately initiated. The system and method also includes means for cutting off a supply of electric energy to a consumer and for automatically reconnecting an electrical system to the power supply when a period of high use has passed. The system may also be expanded to control the use of water.

The invention will now be described in connection with the accompanying drawings.

DESCRIPTION OF THE PREFERRED EMBODIMENTS OF THE INVENTION

Figure 1:
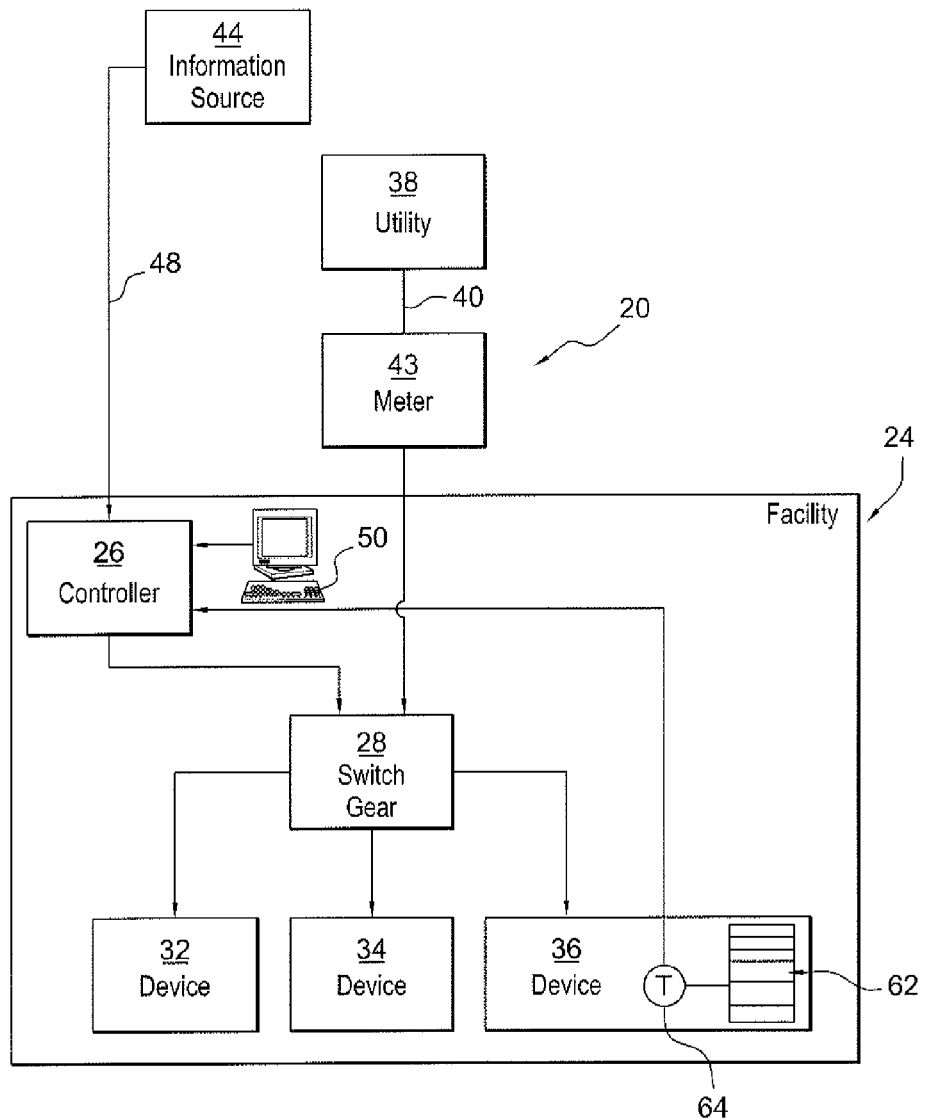
FIG. 1 is a schematic diagram of a prior art power control system.

A prior art power control system is illustrated in FIG. 1 wherein a system 20 controls power consumption within a facility 24. The facility 24 can be a building, residence, store, warehouse, factory, plant or simply a collection of one or more power consuming devices. The system includes a controller 26 which communicates with a switching network 28 which selectively delivers electrical power to one or more power consuming devices 32, 34, 36 within the facility 24. The power consuming devices can be, for example, refrigerators, fans, lights, or HVAC.

The switching network is fed electrical power from a utility 38 through power lines 40 and a calendar-time power consumption meter 43. The meter 43 has the ability to measure and record and/or transmit power usage per time interval, typically every 15 minutes or lower, as described in a U.S. Pat. No. 6,047,274. Although an electrical power distribution is described, the power commodity could be gas or other fossil fuels, as well.

The controller 26 can also communicate with an outside information source 44, such as an Internet site, or a power pool or exchange moderator, via a communication link 48. The communication link 48 can be comprised of telephone lines, coaxial or fiber optic cable, wireless communication, or other type of signal carrying medium. The controller 26 can also have a manual input, such as a keyboard 50.

The power consuming device 36 can be a refrigeration unit for storing food products 62. The system 20 can include a temperature sensor 64 which is in signal communication with the controller 26. The sensor 64 can be a direct insertion sensor or food product core sensor such as described in U.S. Pat. Nos. 6,018,956; 4,184,340; or 3,343,151, herein incorporated by reference. These patents describe temperature sensors that are surrounded by material other than air, which material simulates the time-temperature constant of the product being refrigerated. The sensor more accurately measures the temperature of the product core that is slowly being warmed during load shedding.

Figure 2:
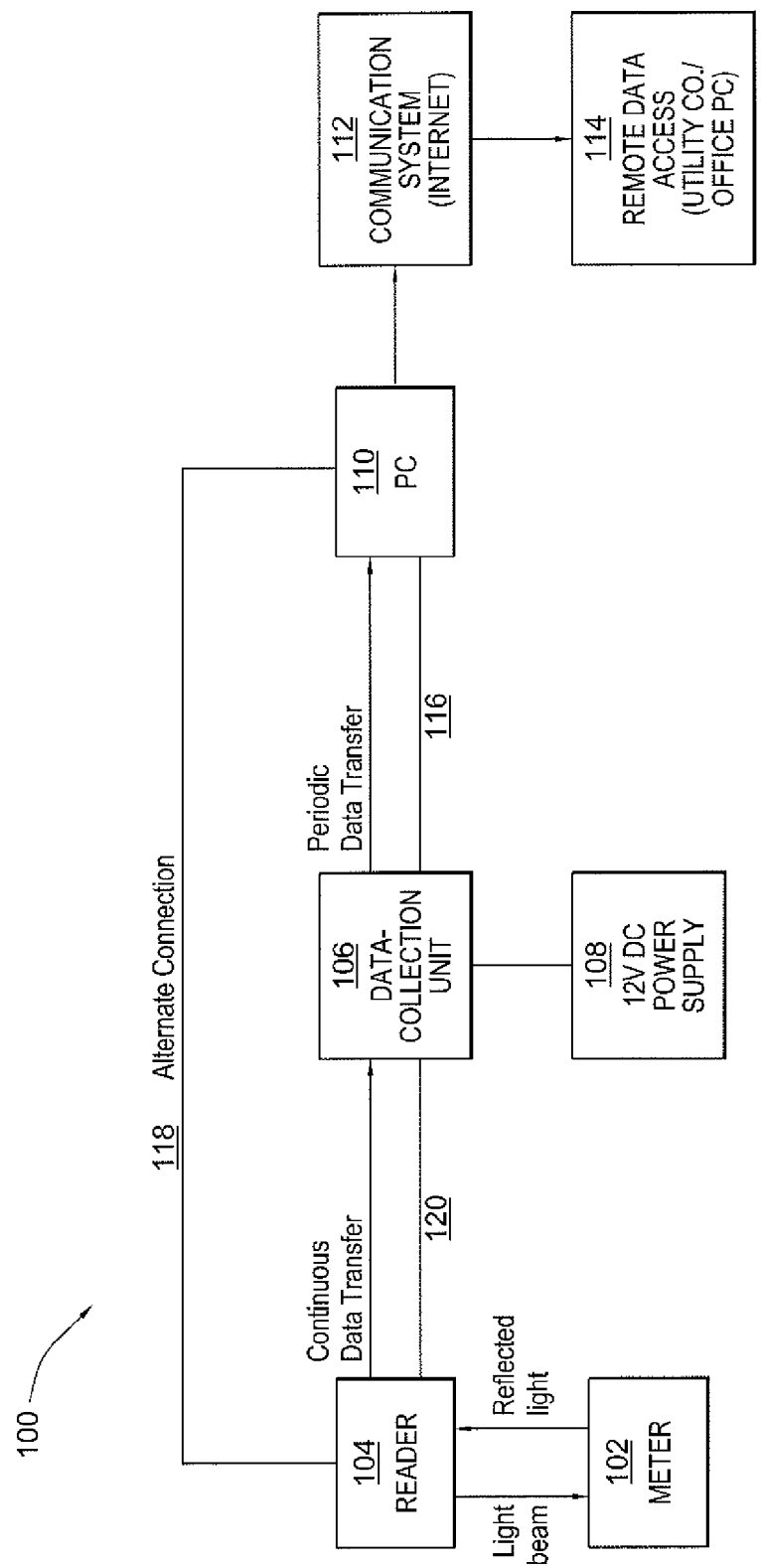
FIG. 2 is a block diagram of another prior art system for monitoring and controlling the use of electrical energy.

FIG. 2 is a block schematic diagram of a prior art apparatus 100 for reading and managing power consumption. As shown in FIG. 2, a reader 104 is attached to a typical utility meter 102 such as an analog or digital power meter commonly found on homes, apartment building and commercial buildings. The reader 104 provides a means for automatically reading power consumption and may eliminate the need for manually reading the meter 102. The data generated by the reader 104 may be continuously transferred through a connection such as a serial cable 120, to a data collection unit 106 or alternatively directly to the monitoring device 110, such as a computer.

The data collector 106 is therefore optional. When provided, the data collection unit stores data generated by the reader 104. The data collection unit 106 may store data for a limited time when the monitoring device (computer) 110 is shut off or in the event of a power failure. With appropriate memory, the unit 106 may be able to store data for up to a year. The data collection unit 106 for a household may include a single serial port interface from the reader 104 such as a RJ-11 or RJ45 and a single serial port to the computer 110 such as a DB-9. The preferred data collection unit 106 is approximately two inches wide and three inches long and includes a 12 volt input, as for example from a wall mounted AC to DC converter 108. A battery, such as a standard watch battery may be provided for backup. Further, the data collection unit 106 may be powered by the serial driver of one pin on the serial port of the computer. The preferred data-collection unit 106 includes a microprocessor such as a PIK Microprocessor including non-volatile memory and a timer crystal. It will apparent that any microprocessor or controller could be used.

Multiple power meters are monitored, such as in an apartment building or a commercial building and may be similar to the household application described above. However, the data collection unit 106 may be provided with inputs for additional readers 104 such as four to eight inputs and an optional Ethernet connector for networking to a single monitoring device 110.

The monitoring device 110 may be a conventional general-purpose computer system or a serial server containing one or more serial ports and an Ethernet port, and need not be specific to this application. The monitoring device 110 receives the data from a cable 118 such as a serial cable which connects directly to the reader 104. Alternatively, a cable 116 may be a serial cable connecting to the optional data-collection unit 106 to a serial port such as a RJ-45 or RJ-11 connector and a serial port out, such as a DB-9 connector. The monitoring device 110 will not lose information during power failure as it stored its data in non-volatile memory and real-time data is only gathered when power is present and being consumed. In addition, when employed, the data collector 106 will not lose its data during an outage because it holds historic values in non-volatile memory and real-time data is only gathered when power is present and thus being consumed.

The monitoring device 110 may be connected to a communication system 112 or network, such as the Internet to allow remote access 114 of the data. For example, a utility company may obtain the data for billing purposes or by the end user who wants to control his power consumption from his PDA or computer form a remote location, such as his office.

A system 198 for monitoring and controlling power consumption in accordance with a preferred embodiment of the present invention will now be described with reference to FIG. 3. The system 198 incorporates an electrical or electronic circuit that provides for the transmission and reception of data including audio and visual signals, by means of electric and telephone circuits to indicate the amount of power consumed as indicated on a monitor. A source of electrical energy such as a substation 200 is controlled by a control center 202. The substation 200 controls the use of energy through a programmable control panel/monitor 204.

The system 198 for monitoring and controlling power consumption in accordance with the present invention will now be described in connection with FIG. 3. As shown, the system 198 includes a substation 200 and a control center 202 for feeding a signal to a programmable control/monitor 204.

The programmable control panel/monitor 204 is connected to a transducer 206 by means of a lead 205. Further, the transducer 206 is connected to a three phase power supply 207 with a neutral connection (n) and outputs labeled r,y, and b. The power from the power supply 207 is provided to a circuit in a conventional manner. For example, a single phase power supply (bn) powers a subsystem for providing warnings in response to various levels of consumption of electrical energy as regulated by the programmable control panel/monitor 204.

The programmable control panel/monitor 204 is connected to a relay and/or switch 205 by lead 203. The second, third and forth relays or switches 209, 210, and 211 work through timers $t_1 t_2 t_3$ respectively depending on the preset load and time. To be more specific, if after initiating a visual alarm, as for example an indicator lamp 213, that may provide a flashing high intensity illumination, a consumer fails to reduce the level of power consumption, the switch or relay 209 in response to the timer $t_1$ sounds a first audio horn 215. The signal 213 or horn produces an audio sound of about 50 to 70 decibels that indicate that the rate of electrical consumption is rapidly approaching a disconnect from the supplier. After the first visual and the second warning i.e. the first audible alarm warning and a signal from timer $t_2$ a second very loud audio signal of about 140-200 decimals is given. This loud signal is given by a horn 220 or other loud sound preferably outside of the structure. This indicates that the discontinuance of power is imminent. Assuming that timer $t_3$ reaches a pre-selected time after activation by relay 211 and without a significant reduction of power to a pre-selected level, a coil 222 activates a switch to disconnect power from the main power supply. Then after a period of time when peak demand has ceased, a coil 222 automatically reconnects the power.

Figure 3:
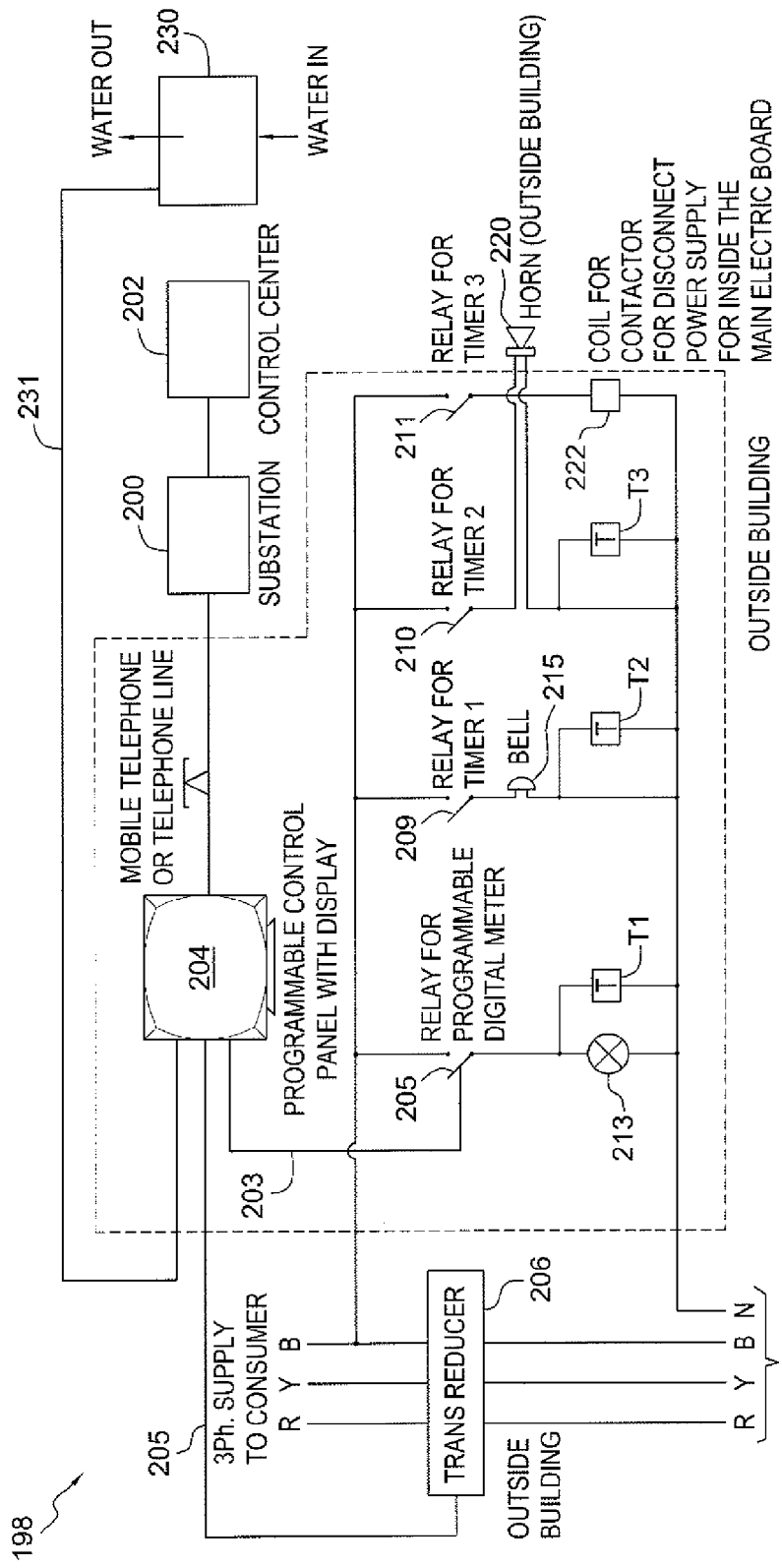
FIG. 3 is a schematic diagram of a system for monitoring and controlling the use of electrical energy in accordance with the present invention.

As shown in FIG. 3, the system may also include an ultra-sonic electromagnet flow meter 230 to measure the consumption of water. The meter 230 is connected to the programmable display 204 by the wire or cable 231. It is also contemplated that the rate of water consumption and the rate of electrical consumption may be simultaneously displayed on the monitor or displayed at the control panel 204. Further, a similar circuit may be provided for pre-warnings as provided above where different sounds or light may be used to distinguish excess usage of water from excess usage of electricity.

Figure 4:
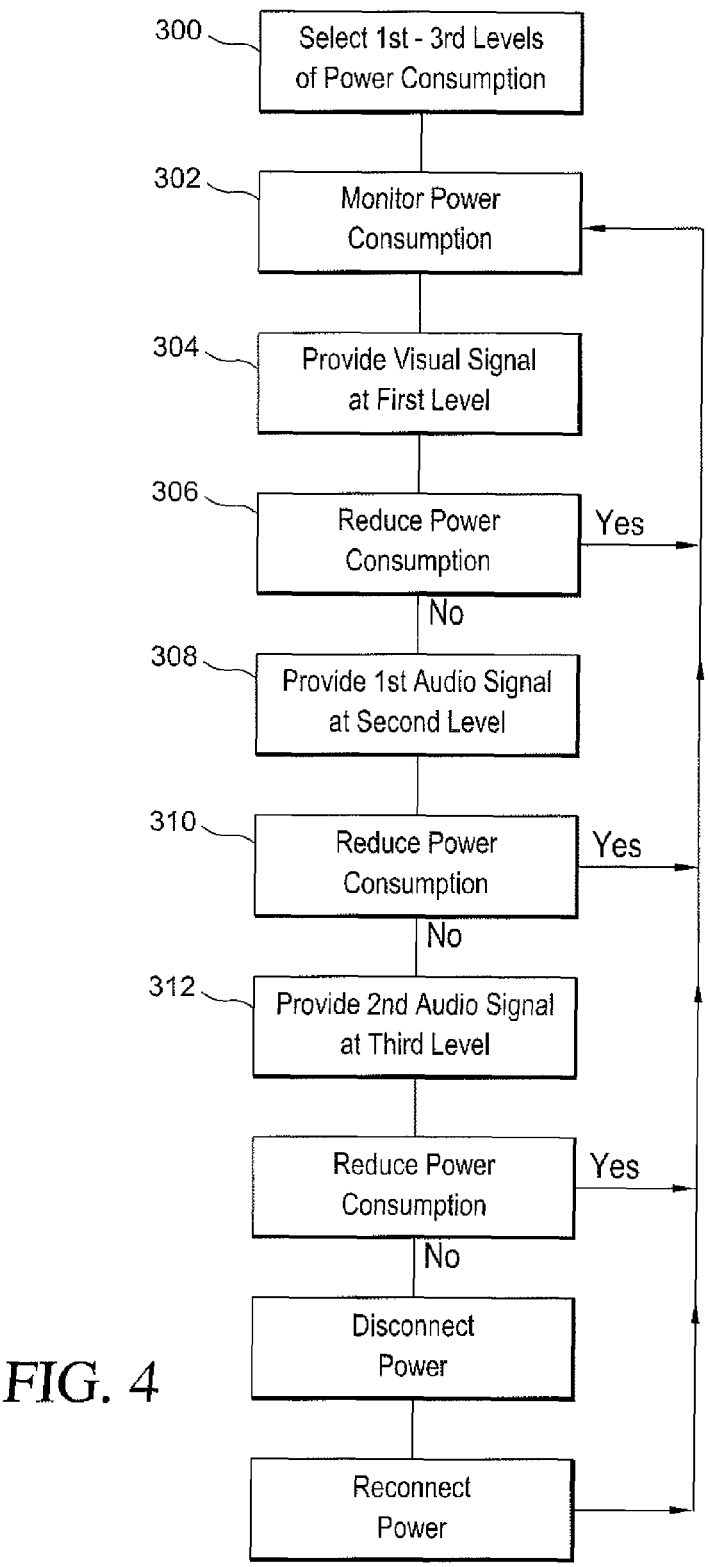
FIG. 4 is a block diagram illustrating a method in accordance with the present invention.

A method in accordance with another embodiment of the invention will now be described with reference to FIG. 4. The method includes a first step 300 of selecting first, second and third levels of usage as for example the rate of energy consumption based on an estimated level or perhaps based on historical use. This rate of use may be selected for periods of peak usage to encourage consumers to reduce their use during such periods. The method also includes a second step 302 that consists of monitoring the present consumption by a user.

The supplier of electrical energy and/or power may set the levels based on prior use and/or needs of the consumer and may program the system to compensate for different times of the day and/or different weather conditions. Further, the power companies may make adjustments to the program to reduce the demand for power during very hot days to avoid brown outs.

When the system indicates a first level of use that suggest excessive use, a visual signal such as a flashing light is given in step 304. As this point, the consumer has an opportunity to ignore the signal i.e. warning or to reduce their power consumption in step 306. When the consumer reduces the power consumption to a predetermined acceptable level as programmed by the power supply company the system reverts to monitoring the power consumption in step 302. However, if the consumer ignores the first signal and continuously uses excessive power i.e. beyond that allotted amount, a second signal or a first audio signal is sounded in step 308. It is presently contemplated that the signals in steps 304 and 308 will be given inside of a house or other structure. It is also contemplated that the first audio signal will have a sound level of between about 50 to 70 decimals.

In step 310 the consumer is again allowed a brief reasonable amount of time to reduce their use of power and if done the continued use of power is maintained. However, if the consumer fails to reduce the power consumption in step 310, a second audio signal 312 is sounded. The second audio signal may have a sound level of between about 140 and 200 decimals and will be provided on the outside of a house or other structure and indicates that the loss of power is imminent. Once again, the consumer is given a brief period of time to reduce their use of power. Finally, if the power is disconnected by means of a coil and after a suitable period of time reconnected.

While the invention has been disclosed in connection with its preferred embodiment it should be recognized that changes and modifications may be made therein without departing from the scope of the appended claims.

What is claimed is:

1. A system for monitoring and controlling power consumption comprising:
    means for setting a plurality of power consumption levels per time-period set points;
    means for monitoring power consumption of a first unit;
    means including a warning device for producing a visual signal indicating that the power consumption during a first pre-selected time-period exceeds a first level set point while continuing to provide power;
    means including an audio-device for producing a first audio signal indicating that the power consumption during a pre-selected time exceeds a second level set point while continuing to provide power;
    means including a second audio-device for producing a second audio signal louder than the first audio signal in response to exceeding the second level set point when the power consumption in a pre-selected time-period exceeds a third level set point;
    means for automatically disconnecting a supply of power at a pre-selected time-period following the second audio signal following exceedance of said third level set point;
    means for reconnecting the supply of power after a pre-selected time-period to thereby provide power to the first unit at a pre-selected time-period following the discontinuance of said supply of power;
    an ultra-sonic electro-magnetic flow meter, for measuring water consumption, connected to a display monitor having a programmed digital reader, a visual alarm, a timer, a circuit breaker and an internal electric current restoration unit; wherein a rate of the water consumption and a rate of the power consumption are displayed on the monitor;
    a first timer and means activated by said first timer to interrupt the visual signal;
    a second timer and means activated by said second timer to interrupt the first audio signal;
    a third timer and means activated by said third timer to interrupt the second audio signal to provide verbal warnings as to remaining time for continuation of power;
    means for monitoring power consumption of a plurality of devices in said units first unit; and
    means for controlling said power consumption of the first unit when said power consumption of the first unit exceeds one of said set points based on a current price, whereby if the current price is below a set amount maintaining power consumption and if the current price is above said amount shedding power to at least one of said plurality of devices.

2. A system for monitoring and controlling power consumption according to claim 1 which includes
    means activated by said third timer to override the disconnect means, before the supply of power is interrupted, when the power consumption is reduced to a lower permissible level set point.

3. A system for monitoring and controlling power consumption according to claim 2 which includes means for controlling the consumption of water.

4. A system for monitoring and controlling power consumption according to claim 1 which includes means for controlling the consumption of water.

* * * * *